United States Patent
Albrecht

(10) Patent No.: US 7,119,450 B2
(45) Date of Patent: Oct. 10, 2006

(54) FUEL SAVING ENGINE DRIVEN AIRCRAFT GROUND POWER DEVICE AND METHOD OF USE

(75) Inventor: Bruce Albrecht, Grayslake, IL (US)

(73) Assignee: Illinois Tool Works Inc., Glenview, IL (US)

( * ) Notice: Subject to any disclaimer, the term of this patent is extended or adjusted under 35 U.S.C. 154(b) by 194 days.

(21) Appl. No.: 10/709,836

(22) Filed: Jun. 1, 2004

(65) Prior Publication Data

US 2006/0157987 A1 Jul. 20, 2006

(51) Int. Cl.
*H02K 5/00* (2006.01)
*H02P 9/04* (2006.01)

(52) U.S. Cl. .................. 290/1 A; 290/40 C; 322/14
(58) Field of Classification Search .......... 290/1 A, 290/2, 40 R, 40 C; 322/14; 307/46, 64
See application file for complete search history.

(56) References Cited

U.S. PATENT DOCUMENTS

| | | | |
|---|---|---|---|
| 3,665,495 A | 5/1972 | Carter et al. | |
| 4,315,163 A | 2/1982 | Bienville | |
| 4,556,247 A * | 12/1985 | Mahaffey | 322/1 |
| 5,111,127 A * | 5/1992 | Johnson | 320/101 |
| 5,198,698 A | 3/1993 | Paul et al. | |
| 5,253,891 A * | 10/1993 | Carlin et al. | 280/422 |
| 5,355,075 A | 10/1994 | Wilson, III | |
| 5,512,811 A * | 4/1996 | Latos et al. | 322/10 |
| 5,625,276 A * | 4/1997 | Scott et al. | 322/24 |
| 5,642,702 A * | 7/1997 | Kouchi et al. | 123/198 E |
| 5,650,713 A * | 7/1997 | Takeuchi et al. | 322/16 |
| 5,767,591 A * | 6/1998 | Pinkerton | 307/64 |
| 5,994,787 A | 11/1999 | Hibino | |
| 6,181,019 B1 * | 1/2001 | Frank | 290/1 A |
| 6,369,461 B1 * | 4/2002 | Jungreis et al. | 307/46 |
| 6,472,846 B1 | 10/2002 | Hutchinson et al. | |
| 6,700,214 B1 * | 3/2004 | Ulinski et al. | 290/40 C |
| 6,700,802 B1 | 3/2004 | Ulinski et al. | |
| 6,819,007 B1 * | 11/2004 | Fukaya | 290/40 C |
| 6,894,625 B1 * | 5/2005 | Kozma et al. | 340/950 |
| 2004/0008009 A1 * | 1/2004 | Fukaya | 322/44 |
| 2004/0011918 A1 * | 1/2004 | Musial et al. | 244/1 R |

FOREIGN PATENT DOCUMENTS

| | | |
|---|---|---|
| DE | 4102636 A1 | 8/1991 |
| JP | 09163635 A | 6/1997 |

* cited by examiner

*Primary Examiner*—Nicholas Ponomarenko
(74) *Attorney, Agent, or Firm*—Ziolkowski Patent Solutions Group, SC

(57) ABSTRACT

The present invention is directed to a power source that includes a housing and an energy storage device arranged to provide an output power. A generator is disposed within the housing and is rechargeable association with the energy storage device.

48 Claims, 3 Drawing Sheets

FUEL SAVING ENGINE DRIVEN AIRCRAFT GROUND POWER DEVICE AND METHOD OF USE

BACKGROUND OF INVENTION

The present invention relates generally to aircraft ground power systems and, more particularly, to an aircraft ground power apparatus designed to respond "on-demand" based on aircraft charging demands. The aircraft ground power apparatus includes an energy storage device capable of providing immediate and sufficient power in conjunction with an internal combustion engine that can be automatically started to compliment the energy storage device and charge the energy storage device to provide sufficient aircraft ground power while saving fuel.

Aircraft sitting at a gate or terminal will normally cease engine operation along with any internal or auxiliary power generating equipment. Particularly, should the aircraft intend to remain on the ground, such as at a terminal, for any significant length of time, the aircraft systems are typically powered from auxiliary systems designed to allow the aircraft systems to operate auxiliary equipment without the need to operate the aircraft engines. The needed auxiliary power is often supplied by portable ground power units carried on wheeled trailers.

When an aircraft is at rest and in need of power, a ground power unit is towed into position by a tractor or tug. Once in place, the aircraft ground power unit is uncoupled from the tractor and its electrical cable is connected to the aircraft by plugging the cable into a receptacle provided on the aircraft. A combination engine driven generator incorporated within the ground power unit is operated to generate power that is supplied to the aircraft via the electrical cable. Typically, the aircraft ground power is connected to the aircraft, the unit is started, and then the operator leaves the unit unattended until power is no longer needed from the aircraft ground power unit. In the interim, the engine and generator operate at an operational or high speed to deliver power to the aircraft independent of actual load. That is, aircraft ground power unit typically requires that the engine and generator be running at full speed to provide correct frequency and power and/or supply a full load to the aircraft. Therefore, while in operation, the aircraft ground power unit is set to deliver a maximum amount of power to the aircraft and, thereby, runs at full speed.

However, while the aircraft ground power unit is connected to an aircraft, the power consumption needs of the aircraft are not necessarily constant or consistent. That is, the individual power consumption needs may vary widely and may even be intermittent. For example, when the aircraft has passengers on board the aircraft may require a relatively large amount of power from the aircraft ground power unit to provide sufficient cooling by the aircraft air conditioning systems. On the other hand, when the aircraft is empty, the aircraft may require a relatively low amount of power from the aircraft ground power unit, such as when only a pilot is on board and only preflight navigational systems are in operation.

Regardless of the power consumption needs of the aircraft, the known engine and generator units operate at full operational speed for the duration of the connection unless an operator arrives to shut down the unit. Accordingly, although the full power generation capabilities of the aircraft ground power unit is not necessary, the engine and generator are continuously run. Accordingly, excess fuel is consumed and additional noise and exhaust are created unnecessarily.

Additionally, aircraft ground power units are often switched from departing aircraft to newly arrived aircraft. When disengaging an aircraft ground power unit from a departing aircraft, the generator of the aircraft ground power unit is powered down and the aircraft ground power unit is removed from the departing aircraft and transported to the newly arrived aircraft. Once at the newly arrived aircraft, the aircraft ground power device is attached to the newly arrived aircraft and then the engine and generator of the aircraft ground power unit must be restarted. However, before power is delivered to the newly arrived aircraft, the generator of the aircraft ground power unit must again reach full operational speed. Specifically, an operator must first start the generator and wait until the generator is at operational speed before power is delivered to the aircraft. This delay in reaching operational power can create unnecessary power consumption from the aircraft's auxiliary power systems while the aircraft awaits power from the aircraft ground power unit. That is, although the aircraft has come to rest and is connected to a aircraft ground power unit, the aircraft continues to draw operational power from internal auxiliary power systems to drive systems such as passenger ventilation and air conditions systems until the generator of the aircraft ground power unit reaches full operational speed and power is finally delivered to the aircraft. This delay in power delivery from the aircraft ground power unit to the aircraft, albeit relatively short, can result in prolonged power draws from the aircraft's internal auxiliary power system which must later be recharged.

It would therefore be desirable to design an aircraft ground power unit that operates on-demand and is dynamically adjustable to the power consumption needs of an associated aircraft. Specifically, it would be desirable to have an on-demand aircraft ground power device that matches the power requirements of the associated aircraft that does not necessarily run the engine continuously.

BRIEF DESCRIPTION OF INVENTION

The present invention is directed to a system and method of delivering remote and portable power that overcomes the aforementioned drawbacks. Specifically, the present invention includes a portable power source that includes an energy storage device to supply an output power to a device, such as an idle aircraft. The portable power source also includes an engine driven power source. A controller is included that switches an electrical configuration of the power source to selectively deliver power between the energy storage device and/or the engine driven power source.

In accordance with one aspect of the present invention, a power source for providing remote electrical power is disclosed that includes a transportable housing, an engine arranged within the transportable housing, and an energy storage device disposed within the housing to provide an output power of the power source. A generator is configured to be driven by the engine and is also disposed within the transportable housing. The generator is arranged in rechargeable association with the energy storage device. A switchable electrical configuration is arranged to switch delivery of output power between the generator and the energy storage device. A controller is configured to automatically switch the switchable electrical configuration to deliver the output power of the power source from one of: the generator, the energy storage device, and a combination of the generator and the energy storage device.

In accordance with another aspect of the present invention, a method of portably providing remote electrical power is disclosed that includes the steps of initiating a power delivery from an energy storage device disposed within a portable housing and starting a fossil fuel driven engine power source disposed within the portable housing. Upon an energy level of the energy storage device reaching a lower threshold, the method includes automatically switching the power delivery from the energy storage device to the fossil fuel driven engine power source.

According to another aspect of the present invention, an aircraft ground power apparatus is disclosed that includes an engine driven power source configured to generate electrical power and an energy storage device connected to the engine driven power source. The energy storage device is configured to directly power an idle aircraft alternately with the engine driven power source.

According to another aspect of the invention, an aircraft ground power device is disclosed that includes a housing and a generator disposed in the housing and configured to deliver power. An energy storage device is included that is rechargeably connected to the generator and configured to power an aircraft over a given duration.

According to yet another aspect of the invention, a method of providing aircraft ground power is disclosed that includes powering an aircraft from an energy storage device of an aircraft ground power unit and alternately powering the aircraft from a generator of the aircraft ground power unit.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

The present invention is directed to a portable power source and, more specifically, to a portable power source to provide remote power that includes both an energy storage device and an engine/generator, each arranged to deliver primary power for the output of the power source. The present invention also includes a controller configured to selectively deliver power from one of the energy storage device, the engine, or combination thereof.

As one skilled in the art will fully appreciate, the hereinafter description of aircraft ground power units only illustrates the preferred embodiment. Therefore, the present invention also includes any system that requires high power outputs, such as remote and/or portable generator system, auxiliary power/power backup systems, and the like.

Figure 1:
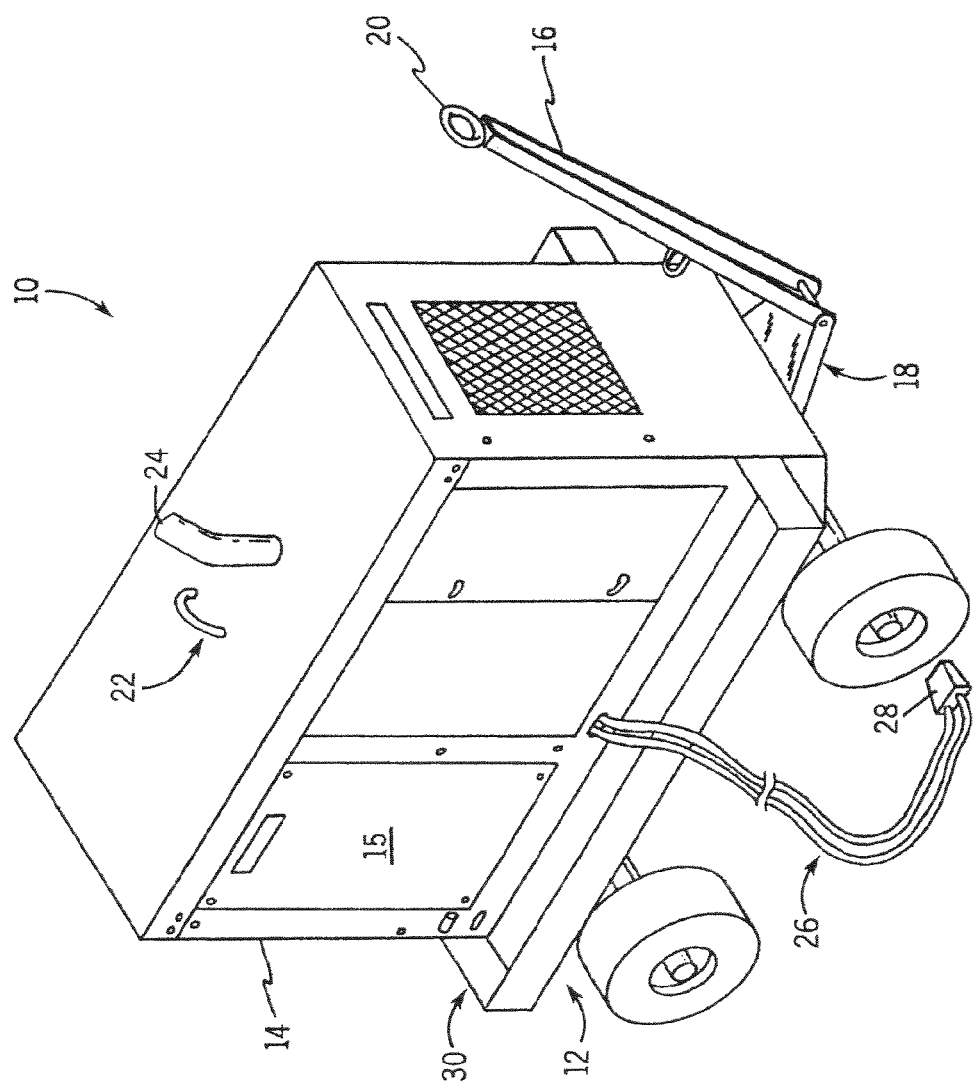
FIG. 1 is a perspective view of an aircraft ground power unit incorporating the present invention.

FIG. 1 shows an aircraft ground power unit 10 in accordance with a preferred embodiment of the invention. Aircraft ground power units, such as illustrated in FIG. 1, are utilized to power aircraft (not shown) when on the ground. The aircraft ground power unit 10 includes a wheeled chassis 12 to aid in portability of a power source 14, which is enclosed in a housing 15. Also to aid in portability, a tow bar 16 is included that is attached to the chassis 12 via a towing bracket 18. A coupling ring 20 of the tow bar 16 is attached opposite the towing lip to facilitate securing the aircraft ground power unit to a towing vehicle (not shown). Additionally, a lift ring 22 may be mounted to the power source 14 to enable removal of the power source 14 from the chassis 12 or, if secured together, lifting of the chassis 12 and power source 14.

As will be described with respect to FIGS. 2 and 3, the power source 14 includes both an energy storage device and a fossil fuel driven generator, as evidenced by an exhaust port 24. An electrical cable 26 extends from the power source 14 and is provided with a plug or connector 28 at its outer end for coupling with a mating connector on an aircraft (not shown).

Larger aircraft tend to utilize ground power units 10 which output AC power via the electrical cable 26, while smaller aircraft tend to utilize ground power units 10 which output DC power via the electrical cable 26, typically at about 28 volts and in the range of several hundred amps. In either case and as will be described, a transformer, rectifier, and/or inverter arrangement may be used to convert power delivered via either the energy storage device, the generator, or a combination thereof included in the power source 14 to the desired AC or DC output. When engaged with an aircraft, power is delivered from the power source 14, either from the energy storage device or the fossil fuel driven generator, to the aircraft. When not in use, the electrical cable 26 is returned to a storage bin 30.

Figure 2:
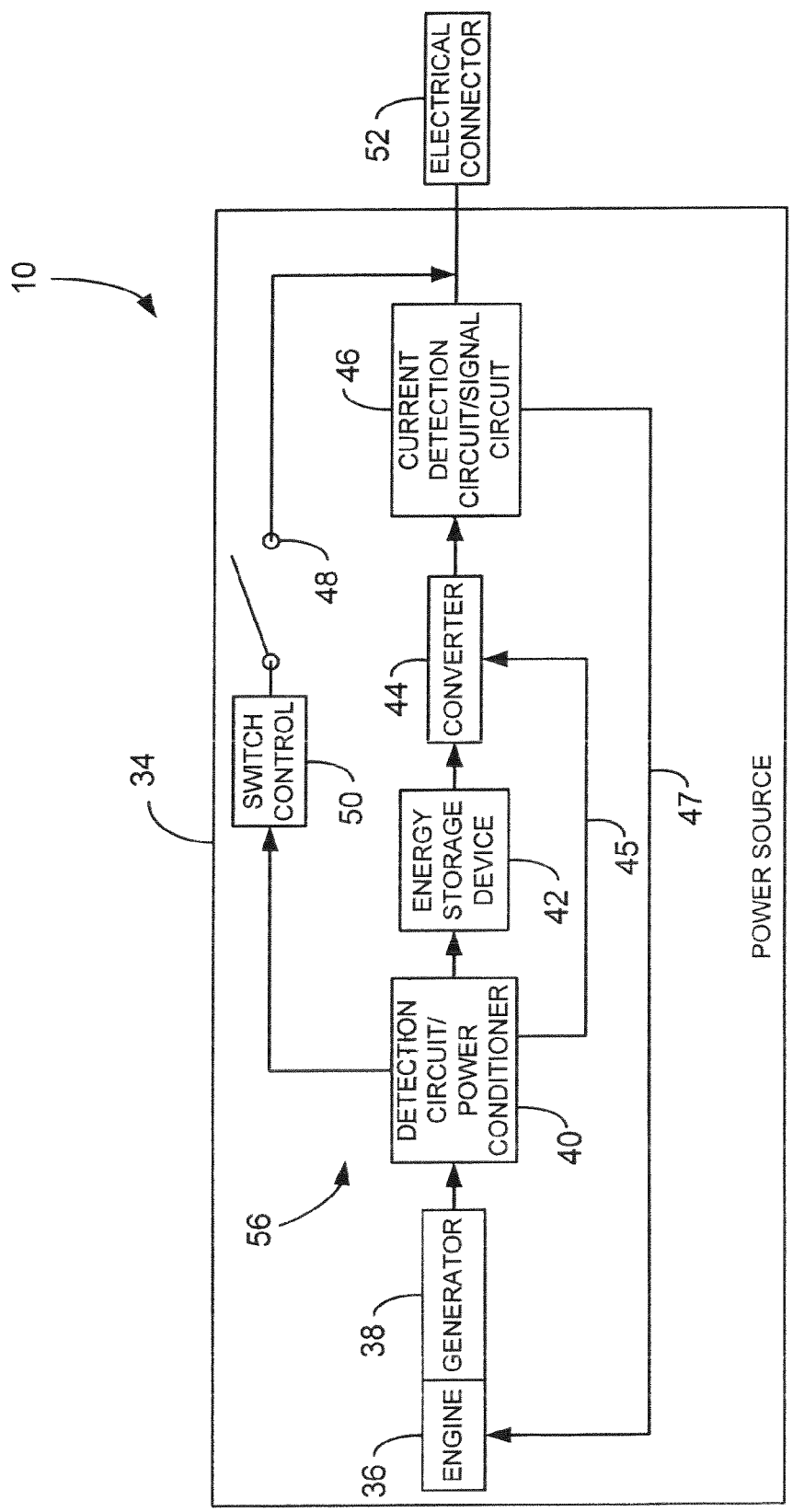
FIG. 2 is a block diagram illustrating some of the components of the aircraft ground power unit shown in FIG. 1 in accordance with one embodiment of the invention.

Referring to FIG. 2, a block diagram of the components of an aircraft ground power unit 10, such as that shown in FIG. 1 is shown. Specifically, a plurality of elements forming a power source 34 of the aircraft ground power unit 10 or any system including a generator is shown. Within the power source 34 is an engine 36 connected to a generator 38. When in operation, the engine 36 drives the generator 38 to produce power which is delivered to a detection circuit/power conditioner 40. The detection circuit/power conditioner 40 is in electrical communication with an energy storage device 42. The energy storage device 42 is controlled to provide power to a converter 44, which, in turn, delivers the conditioned power to a current detection circuit/signal circuit 46. As will be described, a switch 48 is provided that may be controlled by a switch controller 50 to deliver power from the engine 36 and generator 38 to an electrical connector 52 or other auxiliary-type outputs (not shown) to deliver a desired power instead of power from the energy storage device 42, which is then charged by the engine 36 and generator 38. Therefore, it should be appreciated that, together, the detection circuit/power conditioner 40, current detection circuit/signal circuit 46, switch control 50, and switch 48 serve as a controller, designated generally by reference numeral 56, which operates to switch a switchable electrical configuration of the power source 34.

It is contemplated that the engine 36 may be a fossil fuel burning engine. However, it is also contemplated that the engine 36 may also be configured to burn alternative fuels other than fossil fuels, or in conjunction with fossil fuels. For example, it is contemplated that the engine 36 may be configured to consume fuels such as soy diesel and the like. In any case, as will be described, the present invention provides for reduced consumption of the driving fuel whether fossil fuel or alternative fuel.

When the power source 34 is not providing any power to the electrical connector 52 as the output of the power source 34, the switch 48 is in the open position and the engine 36 is off, as shown, and the converter 44 prohibits the energy storage device 42 from discharging. In accordance with a preferred embodiment, when an operator desires the power source 34 to begin power output via electrical connector 52, power is initially delivered from the energy storage device 42 and later, according to a specific configuration of the power source 34, from the generator 38. Specifically, the converter 44 provides the desired power output to the current detection circuit/signal circuit 46 which then delivers the power to the electrical connector 52. As such, the desired power output of the power source 34 is delivered substantially immediately upon operator request, thereby providing an on-demand power source 34 for the aircraft ground power unit 10. Power delivery to the electrical connector 52 continues from the energy storage device 42 until it is time for the engine 36/generator 38 to begin operation, which is dependent upon the specific operational configuration.

In accordance with one embodiment and operational configuration, power delivery to the electrical connector 52 continues from the energy storage device 42 until the energy storage device is depleted below a threshold voltage, current, or power level. Specifically, once the current detection circuit/signal circuit 46 senses current drawn from the energy storage device 42, the current detection circuit/signal circuit 46 begins monitoring the output of the energy storage device 42 to determine whether the output drops below a given threshold, which indicates that the energy storage device 42 may soon not be able to continue power output as required by the associated aircraft or other device being powered by the power source 34. It is contemplated that the threshold may be a current threshold, a voltage threshold, or an overall power output threshold. Further it is contemplated that the threshold may be dynamically selected based on the actual power required at the electrical connector 52.

If the current detection circuit/signal circuit 46 determines that the energy storage device 42 has dropped below the threshold, the current detection circuit/signal circuit 46 generates a start signal 47 that is sent to the engine 36/generator 38 to start the engine 36. As will be described, once the engine 36 and generator 38 are in operation, the energy storage device 42 receives power from the generator 38 to recharge the energy storage device 42. When being recharged, the energy storage device 42 may cease providing power to the electrical connector 52. As such, that the energy storage device 42 and the engine 36/generator 38 autonomously power the electrical connector 52. On the other hand, it is contemplated that both the energy storage device and the engine 36/generator 38 may provide power to the electrical connector 52 simultaneously.

In accordance with another embodiment, power delivery to the electrical connector 52 continues from the energy storage device 42 for a predetermined duration before the engine 36 is caused to begin operation. Specifically, once a predetermined duration has elapsed in which power output has been driven by the energy storage device 42, the current detection circuit/signal circuit 46 generates a start signal 47 that is sent to the engine 36/generator 38 to start the engine 36.

In accordance with another embodiment and operational configuration, once the current detection circuit/signal circuit 46 senses current drawn from the energy storage device 42, the current detection circuit/signal circuit 46 immediately generates a start signal 47 that is sent to the engine 36/generator 38 to start the engine 36. Therefore, substantially simultaneously with the converter 44 closing the electrical connection with the energy storage device 42, a start signal 47 is generated and sent by the current detection circuit/signal circuit 46 to initiate engine start-up. Accordingly, the energy storage device 42 may only be required to deliver power to the electrical connector 52 until the engine 36 and generator 38 have reached sufficient operation to deliver the power required at the electrical connector 52.

Therefore, the power source 34 may be configured such that substantially simultaneously with the current detection circuit/signal circuit 46, a start signal is generated by the current detection circuit/signal circuit 46. The start signal is sent from the current detection circuit/signal circuit 46 to the engine 36, which causes the engine 36 to begin a start-up process.

While it is contemplated that the energy storage device 42 be configured to readily deliver a power suitable for the desired power output of the power source 34, in alternate embodiments, it may not be so configured. Preferably, the power delivered from the energy storage device 42 to the converter 44 is converted by the converter 44 to a power suitable for the desired output of the power source 34. The converter 44 may include a transformer, rectifier, and/or inverter arrangement that is used to convert the DC power from the energy storage device 42 to either an AC or DC power output as required by the aircraft or device connected at the electrical connector 52.

For example, should an aircraft be connected via the electrical connector, larger aircraft tend require 400 hertz (Hz) AC power while smaller aircraft tend require DC power, typically at about 28 volts and in the range of several hundred amps. Therefore, it is contemplated that the converter 44 may be specifically designed such that any AC or DC power may be delivered to the electrical connector 52 with characteristics desired by the attached device.

It is also contemplated that a boost and/or buck circuit configuration may be used in conjunction with the energy storage device 42 to deliver an output power of the power source 34 desired for a particular process or device/aircraft. As such, it should be recognized that numerous configurations may be utilized to configure the converter 44. That is, the use of a forward converter, resonant converter, Cuk converter, full-bridge converter, half-bridge converter, AC bridge and the like, are equivalent substitutions.

In any case, while the energy storage device 42 is providing operational power for the power output of the power source 34, the engine 36 may be triggered to begin a start-up period. During this start-up period, the engine 36 starts and while getting up to operational speed, the generator 38 is not yet sufficiently driven to generate operational power. During this start-up or initialization period, power for the output of the power source 34 is continuously supplied to the electrical connector 52 by the energy storage device 42, and the detection circuit/power conditioner circuit 40 operates as a sensor to determine whether the generator 38 is producing enough power for the required output power from the power source 34.

Once the current detection circuit/power conditioner circuit 40 determines that the generator 38 is providing a sufficient power to satisfy the requirements of the output power, the engine 36 and generator 38 operate in a post-initialization or post-start-up period and the current detection circuit/power conditioner circuit 40 sends a feedback signal 45 to the converter 44 and the switch control 50 indicating that the engine 36 and generator 38 are operating sufficiently to deliver the power output required of the power source 34.

Accordingly, the converter 44 opens the electrical connection between the energy storage device 42 and the current detection circuit/signal circuit 46. Substantially simultaneously with the converter 44 opening, or immediately prior to, the switch control 50 closes the switch 48 thereby providing power from the engine 36 to the electrical connector 52 as the output of the power source 34. The electrical opening performed by the converter 44 and electrical closing of the switch 48 are performed rapidly and substantially simultaneously such that the power output of the power source 34 as delivered by the electrical connector 52 is uninterrupted and unnoticeable to the user or aircraft/device being powered. That is, the switching of the components driving power output to the electrical connection 52 occurs such that the operator of the aircraft ground power unit 10 or the aircraft/device receiving power is unaware of the switching and power delivery occurs unimpeded.

However, if a break in the required power output occurs, such as a disconnection of the electrical connector 52, the current detection/signal circuit 46 senses an interruption and generates a signal that is sent to shutdown the engine 36. It is contemplated that a time delay can be used to prevent frequent start/stops of engine 36 for brief interruptions in power consumption by the aircraft/device connected via the electrical connection 52 versus a manual shut down of the engine or a disconnection of the electrical connector 52. Additionally, before shutting down, the detection circuits 40, 46 ensure that the energy storage device 42 is substantially recharged. As such, the power source 34 operates more efficiently, and noise and combustion emission generated by the engine 36 are reduced.

Once power is no longer being delivered by the generator 38 and is detected by the detection circuit/power conditioner 40, the detection circuit/power conditioner 40 sends a signal to the switch control 50 that causes the switch control 50 to open the switch 48.

After the break in the require power output from the power source 34 ends, the previously described operation is reiterated. That is, operational power is again delivered by the energy storage device 42 until depleted below a threshold or while the engine 36 begins the start-up period. Once engine start-up is complete, an electrical configuration of the power source 34 is switched to deliver power from the engine 36 and generator 38.

Various systems and techniques are contemplated to recharge the energy storage device 42. In accordance with one embodiment of the invention shown in FIG. 2, start-up of the engine 36 is only initiated once the energy storage device 42 is sufficiently depleted. That is, as stated, the converter 44 monitors characteristics of the power delivered by the energy storage device 42 and if a current, voltage, or power characteristic of the energy storage device 42 drops below a threshold, the engine 36 enters a start-up period. Once the engine enters a post-start-up period, the electrical configuration of the power source 34 is switched to drive the output of the power source 34 from the generator 38 and the energy storage device 42 is switched off. Additionally, as will be described, power is delivered from the generator 38 to recharge the energy storage device 42. Accordingly, the energy storage device 42 is efficiently utilized, and short engine running durations are avoided. Again, it should be appreciated that together the detection circuit/power conditioner 40, current detection circuit/signal circuit 46, switch control 50, and switch 48 serve to function as a controller, designated generally by reference numeral 56.

In accordance with one embodiment of the invention, an energy storage device 42 recharging technique is utilized whereby the engine 36 and generator 38 are configured to deliver more power than required as the output of the power source 34. In this case, once the engine 36 is operating to deliver the requisite output power to the electrical connector 52, the detection circuit/power conditioner 40 may intermittently supply some power to the energy storage device 42. The supply of charging power may be dependent upon the same power depletion threshold of the energy storage device 42 that triggers the operation of the engine 36 or may be a separate lower power depletion threshold of the energy storage device 42. In any case, once recharging is triggered the detection circuit/power conditioner 40 closes an electrical connection to the energy storage device 42 across which power is delivered for recharging the energy storage device 42. However, in accordance with a preferred embodiment, raw power from the generator 38 is not delivered directly to the energy storage device 42. Instead, the detection circuit/power conditioner 40 includes a conversion circuit configured to condition the power delivered to the energy storage device 42 to be within a charging power range. For example, it is contemplated that the detection circuit/power conditioner 40 may include a buck converter, or other similar converter, to limit current supplied to the energy storage device 42. As such, the energy storage device 42 is preferably recharged with a trickle charge whenever the engine 36 is at full operational speed.

In accordance with another embodiment of the invention shown in FIG. 2, power is not diverted to the energy storage device 42 while the engine 36 is providing the output power of the power source. Rather, upon sensing a break in the output power required at the electrical connection 52, the switch control 50 opens the switch 48 and the detection circuit/power conditioner 40 closes to deliver a charging power to the energy storage device 42. In this case, the engine 36 remains running for a predetermined time after the break in the output power draw via the electrical connector 52. As such, the detection circuit/power conditioner 40 receives power from the generator 38, converts the power to a suitable charging power, and provides the charging power to the energy storage device 42 to recharge the energy storage device 42 for the next operational cycle of the output power draw from the power source 34.

Figure 3:
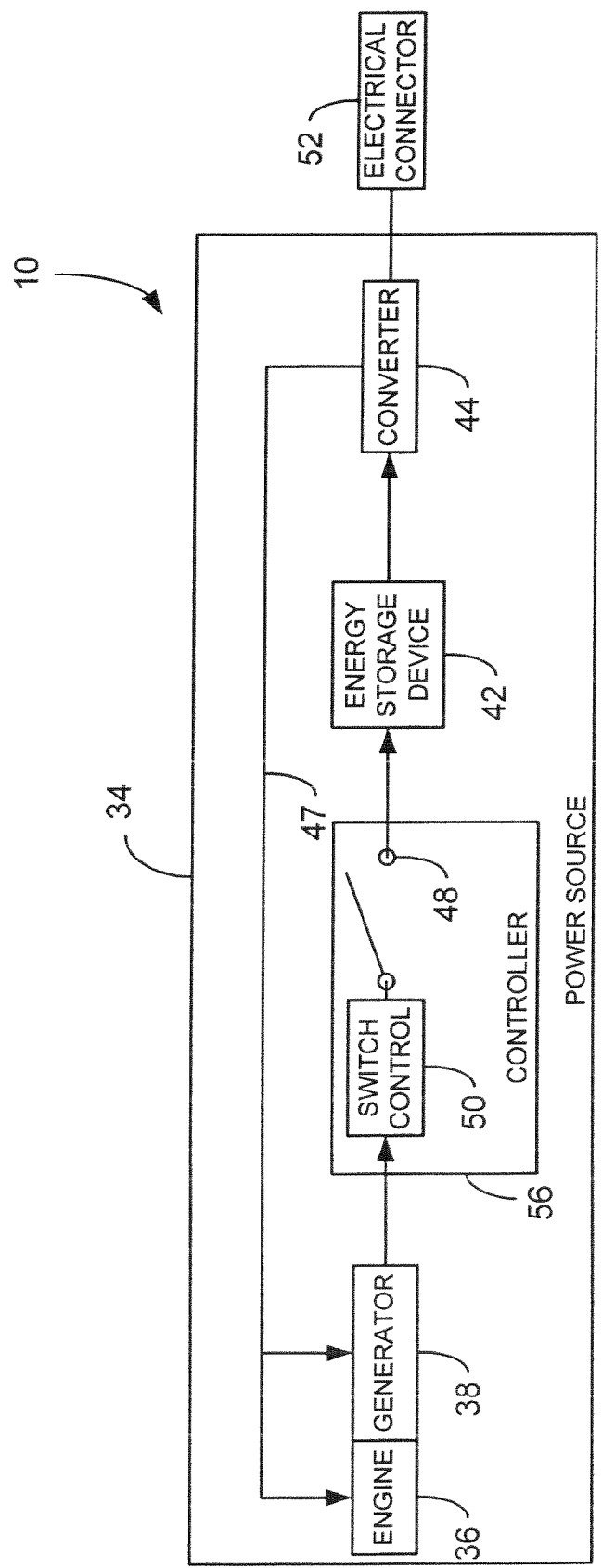
FIG. 3 is a block diagram illustrating some of the components of the aircraft ground power unit shown in FIG. 1 in accordance with another embodiment of the invention.

Referring now to FIG. 3, a block diagram, in accordance with an alternative embodiment of the components of aircraft ground power unit 10 of FIG. 1, is shown. In accordance with this embodiment, the engine 36 and generator 38 are connected to the switch control 50 and switch 48. The switch 48 is controlled by switch control 50 to limit power delivery from the generator 38 to the energy storage device 42. As such, the power output of the power source 34 is always delivered from the energy storage device 42 while the engine 36 and generator 38 serve to recharge the energy storage device 42. That is, once the operator initiates power output from the power source 34, the converter 44 allows power to be delivered from the energy storage device 42 to the electrical connector 52. Power delivery continues from the energy storage device 42 until the power draw via the electrical connector 52 ceases. The engine 36 and generator 38 are only caused to operate should the energy storage device 42 be depleted to a predetermined level in order to avoid excessive operation and starts/stops of the engine 36 and generator 38. As such, the energy storage device 42 serves to provide on-demand output power for the power source 34 and the engine 36 serves to recharge the energy storage device 42.

In accordance with one embodiment, the engine 36 is caused to initiate start-up in response to the converter 44 supplying any power to the electrical connector 52 and sends a start command signal 47 to the engine 36/generator 38. As such, engine start-up begins substantially simultaneously with operator initiation of the power draw via the electrical connector 52. In this case, the engine 36 begins start-up while the energy storage device 42 provides the required output power from the power source 34. Once the engine 36 reaches a post-start-up period, the switch control 50 closes the switch 48 and a charging power is delivered to the energy storage device 42. Therefore, the switch control 50 and switch 48 function as a controller 56 designed to deliver charging power to the energy storage device 42 once the engine 36 reaches the post-start-up period. The charging power is within a charging power range for the energy storage device 42. Accordingly, as power is being drawn from the energy storage device 42 to serve as the output of the power source 34, the energy storage device 42 is simultaneously being recharged. When the power draw at the electrical connector 52 ceases, the engine 36 continues operating for a predetermined period to allow the energy storage device 42 to reach full charge.

In accordance with another embodiment, the engine 36 is caused to initiate start-up only after a break in the power draw at the electrical connector 52 is detected. As such, engine start-up begins shortly after the power draw at the electrical connector 52 ends. In this case, the engine 36 begins start-up once the energy storage device 42 is no longer delivering power for the output of the power source 34. Once the engine 36 reaches a post-start-up period, the switch control 50 closes the switch 48 and a charging power within a charging power range of the energy storage device 42 is delivered directly from the generator to the energy storage device 42. The engine 36 is configured to continue operation until the energy storage device 42 reaches a substantial recharge state.

In either case, the invention allows on-demand delivery of power necessary to effectuate a desired power deliver from the power source 34. Furthermore, these specific configurations allow the size and power generation ability of the engine 36 and generator 38 to be smaller than an engine and generator configuration that is otherwise necessary.

Therefore, the above-described system enables on-demand responsiveness from a portable power source to provide remote power to a device. The system generates less noise and consumes less fuel than traditional engine driven power sources that do not utilize such an energy storage device to deliver at least a portion of the output power of the power source. It is contemplated, that the engine and generator may operate at various frequencies and speeds, while not affecting the power source output or any auxiliary output.

Therefore, the present invention includes a power source for providing remote electrical power. The power source includes a transportable housing, an engine arranged within the transportable housing, and an energy storage device disposed within the housing to provide an output power of the power source. A generator is configured to be driven by the engine, disposed within the transportable housing, and arranged in rechargeable association with the energy storage device. A switchable electrical configuration is arranged to switch delivery of output power between the generator and the energy storage device. A controller is configured to automatically switch the switchable electrical configuration to deliver the output power of the power source from one of the generator and the energy storage device.

In another embodiment of the present invention, a method of portably providing remote electrical power includes the steps of initiating a power delivery from an energy storage device disposed within a portable housing and starting a fossil fuel driven engine power source disposed within the portable housing. Upon an energy level of the energy storage device reaching a lower threshold, the method further includes automatically switching the power delivery from the energy storage device to the fossil fuel driven engine power source.

An alternate embodiment of the present invention has an aircraft ground power apparatus is disclosed that includes an engine driven power source configured to generate electrical power and an energy storage device connected to the engine driven power source. The energy storage device is configured to directly power an idle aircraft alternately with the engine driven power source.

A further embodiment of the present invention includes an aircraft ground power device. The aircraft ground power device includes a housing and a generator disposed in the housing and configured to deliver power. An energy storage device is included that is rechargeably connected to the generator and configured to power an aircraft over a given duration.

According to yet another embodiment of the present invention, a method of providing aircraft ground power includes powering an aircraft from an energy storage device of an aircraft ground power unit and powering the aircraft from a generator of the aircraft ground power unit alternately with the energy storage device.

The present invention has been described in terms of the preferred embodiment, and it is recognized that equivalents, alternatives, and modifications, aside from those expressly stated, are possible and within the scope of the appending claims.

The invention claimed is:

1. A power source for providing remote electrical power comprising:
   a transportable housing;
   an engine arranged within the transportable housing;
   an energy storage device disposed within the housing to provide an output power of the power source;
   a generator configured to be driven by the engine, disposed within the transportable housing, and arranged in rechargeable association with the energy storage device;
   a switchable electrical configuration arranged to switch delivery of output power between the generator and the energy storage device; and
   a controller configured to automatically switch the switchable electrical configuration to deliver the output power of the power source from one of: the generator, the energy storage device, and a combination of the generator and the energy storage device.

2. The power source of claim 1 wherein the controller is configured to only switch the switchable electrical configuration of the power source to provide the output power of the power source from the generator upon detection of a power indication of the energy storage device falling below a predetermined threshold.

3. The power source of claim 2 wherein the power indication of the energy storage device is acquired from at least one of a current indicator, a voltage indicator, and a power indicator.

4. The power source of claim 1 wherein the engine is configured to begin operation to charge the energy storage device upon energy depletion of the energy storage device below a threshold.

5. The power source of claim 1 wherein the controller is configured to deliver the output power of the power source from the energy storage device and automatically switch the switchable electrical configuration to deliver the output power of the power source from the generator upon detecting output power from the generator above a desired threshold.

6. The power source of claim 5 wherein the generator is configured to charge the energy storage device intermittently while the energy storage device provides the output power of the power source.

7. The power source of claim 5 wherein the engine and generator are configured to charge the energy storage device automatically based upon an output power demand.

8. The power source of claim 1 wherein the controller is further configured to automatically switch the switchable electrical configuration of the power source to provide the output power of the power source from the energy storage device during a first operational period and from the generator during a second operational period.

9. The power source of claim 8 wherein the first operational period is a startup period of the generator and wherein the second operational period is a post-startup period of the generator.

10. The power source of claim 8 wherein the controller is configured to automatically switch the switchable electrical configuration of the power source without interrupting the output power of the power source.

11. The power source of claim 1 wherein the generator is configured to provide a charging power to the energy storage device.

12. The power source of claim 11 wherein the generator is configured to also provide the output power of the power source.

13. The power source of claim 11 wherein the generator is configured to exclusively deliver the charging power to the energy storage device.

14. The power source of claim 1 further comprising a sensor configured to detect a signal delivered by the generator and provide feedback to a controller configured to control the switchable electrical configuration of the power source.

15. The power source of claim 14 wherein the controller is further configured to automatically switch the switchable electrical configuration of the power source to deliver the output power of the power source from the generator upon receiving a signal from the sensor indicative of post-startup generator operation.

16. The power source of claim 1 wherein the controller is configured to cause the generator to recharge the energy storage device only after the output power of the power source drops below an output threshold.

17. The power source of claim 16 wherein the output threshold is zero.

18. A method of portably providing remote electrical power comprising the steps of:
   initiating a power delivery from an energy storage device disposed within a portable housing;
   starting a fossil fuel driven engine power source disposed within the portable housing; and
   upon an energy level of the energy storage device reaching a lower threshold, automatically switching the power delivery from the energy storage device to the fossil fuel driven engine power source.

19. The method of claim 18 wherein the step of initiating the power delivery from the energy storage device and the step of starting of the fossil fuel driven engine power source occur substantially simultaneously.

20. The method of claim 18 further comprising the step of charging the energy storage device from the fossil fuel driven engine power source until the battery reaches an upper threshold.

21. The method of claim 18 wherein the fossil fuel driven engine power source is configured to also be operable by consuming alternative fuels.

22. The method of claim 18 further comprising the steps of monitoring power delivery and upon detecting a break in the power delivery, automatically disabling the fossil fuel driven engine power source.

23. The method of claim 18 further comprising the step of autonomously performing the power delivery from one of the energy storage device and the fossil fuel driven engine power source.

24. The method of claim 18 further comprising the step of charging the energy storage device from the fossil fuel driven engine power source upon detecting the energy level of the energy storage device reaching another lower threshold.

25. An aircraft ground power apparatus comprising:
   an engine driven power source configured to generate electrical power;
   an energy storage device connected to the engine driven power source and configured to automatically and directly power an idle aircraft alternately with the engine driven power source.

26. The aircraft ground power apparatus of claim 25 further comprising a portable housing and wherein the engine driven power source and the energy storage device are disposed substantially within the housing.

27. The apparatus of claim 25 further comprising a power source controller configured to selectively power the aircraft from at least one of the engine driven power source and the energy storage device.

28. The apparatus of claim 27 wherein the power source controller is configured to switch an electrical configuration of the aircraft ground power apparatus to power the aircraft from the energy storage device during an initialization period and from the engine driven power source during a post-initialization period.

29. The apparatus of claim 28 wherein the initialization period includes an engine start-up period of the engine driven power source.

30. The apparatus of claim 28 wherein the power source controller is configured to automatically switch the electrical configuration of the aircraft ground power apparatus without interrupting the power to the aircraft.

31. The apparatus of claim 27 further comprising a sensor configured to detect a signal indicative of an output delivered by the engine driven power source.

32. The apparatus of claim 31 wherein the power source controller is configured to receive feedback from the sensor and to switch an electrical configuration of the aircraft ground power apparatus to power the aircraft from the engine driven power source upon receiving feedback from the sensor.

33. The apparatus of claim 27 wherein the engine driven power source includes an engine configured to drive a generator during operation and wherein the power source controller is configured to cease operation of the engine upon detecting a break in aircraft powering.

34. The apparatus of claim 33 wherein the engine driven power source is configured to supply electrical power to deliver a charging power to the energy storage device during operation of the engine.

35. The apparatus of claim 27 wherein the power source controller is configured to power the aircraft from the energy storage device and to switch an electrical configuration of the aircraft ground power apparatus to power the aircraft from the engine driven power source upon detecting a voltage drop of the energy storage device below a threshold.

36. The apparatus of claim 25 wherein the engine driven power source is configured to charge the energy storage device during a break in powering the aircraft.

37. The apparatus of claim 25 wherein the energy storage device is configured to power the aircraft and the engine driven power source is configured to charge the energy storage device.

38. The apparatus of claim 27 wherein the engine driven power source and energy storage device are configured to deliver a power output auxiliary to an aircraft power output.

39. An aircraft ground power device comprising:
a housing;
a generator disposed in the housing and configured to deliver power;
an energy storage device rechargeably connected to the generator and configured to power an aircraft over a given duration; and
a switch controller switchably connected to the generator and the energy storage device and configured to connect the generator to power the aircraft after the given duration.

40. The aircraft ground power device of claim 39 wherein the generator is further configured to deliver a power auxiliary to the power to the aircraft.

41. The aircraft ground power device of claim 39 wherein the generator is configured to power the aircraft upon an expiration of the given duration.

42. The aircraft ground power device claim 33 wherein generator and the energy storage device are configured to power the aircraft substantially simultaneously upon connection to the aircraft.

43. The aircraft ground power device of claim 39 wherein the energy storage device is disposed within the housing.

44. The aircraft ground power device of claim 39 further comprising a controller configured to switch an electrical configuration of the aircraft ground power device to deliver power from one of the generator and the energy storage device to power the aircraft.

45. A method of providing aircraft ground power comprising:
powering an aircraft from an energy storage device of an aircraft ground power unit;
detecting a load to be supported; and
automatically powering the aircraft from a generator of the aircraft ground power unit alternately with the energy storage device based on the detected load.

46. The method of claim 45 further comprising only powering the aircraft from the generator of the aircraft ground power unit if a voltage of the energy storage device of the aircraft ground unit is below a threshold.

47. The method of claim 45 further comprising recharging the energy storage device from the generator.

48. The method of claim 45 further comprising monitoring a power requirement of the aircraft and upon detecting a power requirement of the aircraft below a threshold, automatically disabling the generator.

* * * * *